United States Patent [19]

Clausen

[11] 4,442,608
[45] Apr. 17, 1984

[54] VEHICLE FRAME MEASUREMENT DEVICE

[75] Inventor: Allan H. Clausen, Lomita, Calif.

[73] Assignee: Continental Custom Bridge Company, Alexandria, Minn.

[21] Appl. No.: 431,810

[22] Filed: Sep. 30, 1982

[51] Int. Cl.³ .......................................... G01B 5/255
[52] U.S. Cl. ................................. 33/288; 33/180 AT
[58] Field of Search ................ 33/288, 335, 180 AT, 33/181 AT

[56] References Cited

U.S. PATENT DOCUMENTS

| D. 245,967 | 10/1977 | Charties | D10/61 |
|---|---|---|---|
| 3,869,804 | 3/1975 | Friend | 33/288 |
| 4,015,338 | 4/1977 | Kunze et al. | 33/228 |
| 4,055,061 | 10/1977 | Bayorgeon et al. | 33/288 |
| 4,058,903 | 11/1977 | Wilkerson | 33/288 |
| 4,098,003 | 7/1978 | Negrin | 33/288 |
| 4,193,203 | 3/1980 | Le Grand et al. | 33/180 AT |
| 4,242,803 | 1/1981 | Dory | 33/288 |
| 4,302,883 | 12/1981 | MacGregor | 33/288 |
| 4,321,754 | 3/1982 | Colby | 33/180 AT |
| 4,329,784 | 5/1982 | Björk | 33/288 |
| 4,330,945 | 5/1982 | Eck | 33/288 |
| 4,337,636 | 7/1982 | Clausen | 72/457 |
| 4,386,468 | 6/1983 | Whitaly | 33/180 |

OTHER PUBLICATIONS

Sun Electric Corporation, Automotive Body Repair News, 20:9, p. 7, 9/81.
Blackhawk, Automtive Body Repair News, 20:9, pp. 23–24, 9/81.
Car Bench, Automotive Body Repair News, 20:9, p. 30, 9/81.
Blackhawk, Universal Measuring System, Operating Instruction ACS-204.
Miscellaneous Car-o-Liner Advertisements Including 12/80 Advertisement From Craftsman.
KJ Lazer Beam, Body Shop Business, Apr. 1982, pp. 33–34.
Dataliner 80 Ad, Western Technicran, Jun., 1982.

Primary Examiner—Willis Little
Attorney, Agent, or Firm—Jeffrey G. Sheldon

[57] ABSTRACT

A vehicle frame measuring and aligning apparatus comprises parallel rails with transverse reference members moveable along the longitudinal axis of the rails slideable vertical locating members are mounted on the rails. The apparatus also comprises an overhead measuring and alignment device which is slideably attached to the rails, with a vertically adjustable overhead bar to which referencing and measuring members attach. Clamping devices are used to secure the vehicle in place.

6 Claims, 4 Drawing Figures

VEHICLE FRAME MEASUREMENT DEVICE

BACKGROUND OF THE INVENTION

1. Field of the Invention

The present invention relates generally to a vehicle frame and body measurement and alignment apparatus.

2. Description of the Prior Art

Repairing a unibody vehicle after a collision presents a multitude of problems which have been dealt with in a variety of ways by the prior art. The vehicle must be rigidly secured to the straightening device so that pulling forces may be applied to the damaged area of the vehicle. Since these forces are applied from several directions, it is desirable to have a measuring system that is capable of locating the correct position to which a damaged vehicle component must be aligned and that does not require the operator to relocate the specified positioning should the vehicle body move relative to the straightening device during the pulling process.

Many prior art measurement systems are rigidly attached to the frame straighening apparatus, e.g. the system manufactured by Car Bench. One system, the Blackhawk Korek/Bench, uses a measuring frame on wheels and a series of slotted trams in the form of a jig to anchor the pulling devices. Another system, manufactured by Sun Electronics Corp., uses a special mobile frame to support and measure each different type of vehicle; the pulling device being independent of the frame device. All of these types of devices have the disadvantages of requiring that the entire system be realigned if, during the straightening process, any element in the set-up moves from its original positions.

One apparatus, manufactured by Car-o-liner, has a lower measurement system that is independent of the frame that supports the vehicle but is only useable on the supporting frame manufactured by that company. In addition, the system used in that apparatus to align the upper portion of the body is rigidly attached to the straightening device. Its use is limited in that it can only be used with the single corresponding vehicle support frame produced by the manufacturer of the measuring system, that it requires that the vehicle be held totally rigid when the upper body measurements are made to avoid time-consuming realignment of the entire measuring system, and that its use is restricted to only two of the upper body openings, the trunk and the under-hood areas.

Another device, disclosed by U.S. Pat. No. 4,321,754, is for use only in realigning the front McPherson Strut towers and related inner front structure of the vehicle. It requires that the lower portion of the vehicle be aligned prior to its use. The device is then attached to two reference points on the lower portion of the vehicle which allows the McPherson Strut towers to be aligned. It appears that it cannot be used for any other purpose.

Therefore, there is a need for a frame measurement apparatus which has the features of being independent of the straightening device, so that it is adaptable to any frame straightening system; that has an overhead measurement system which is independent of the straightening device and whose measurement can be directly correlated to the lower system measurements; and has the ability to measure body openings other than the under-hood and trunk areas.

SUMMARY OF THE INVENTION

The present invention is directed to a unibody vehicle body measurement apparatus and alignment which meets this need. The apparatus, which is used with a vehicle frame straightening device having ramps; comprises an underbody and overhead system, slideably interconnected with these features. The apparatus includes at least two elongated rails which lie on the straightening device with their longitudinal axis parallel to the longitudinal axis of the ramps, fixed in parallel by a series of transverse support members. The underbody portion includes a plurality of reference members, substantially perpendicular to the rails and slideably attached thereto, supporting at least one vertical locator. Each vertical locator is vertically adjustable, such that it may attach to a reference point on the vehicle, and it may be moved along the axis of the referencing members.

The referencing member may be moved along the longitudinal axis of the rails. This allows the locators to be adjusted to any point within the plane of the measuring device and form a substantially vertical axis thereto with one end attached to the vehicle and the other to the measuring apparatus. Clamping devices are used to support the vehicle on vehicle straightening systems as the correct height such that the remainder of the measuring device may be adapted to various vehicle straightening systems. The clamps comprise a set of clamping devices adjustable along both the longitudinal axis of the ramp supporting the vehicle and the axis substantially perpendicular to the longitudinal axis of the ramp. The clamps include means to grip an undamaged portion of the lower vehicle frame.

The apparatus also comprises an overhead measurement system, slideably attached to the rails, for measurement and alignment of the upper vehicle body components including the under-hood area, the rear opening area, and the passenger compartment area. The overhead portion comprises a pair of vertical uprights, removably attached to two correlating members, slideably attached to the rails. A horizontal bar is removably attached to the uprights, substantially perpendicular to both the longitudinal axis of the rails and the vertical axis of the uprights. Vertically adjustable locators are slideably attached to the horizontal bar.

The overhead portion of the system can also include a pivotal telescopic bar, rigidly attachable at the midpoint of the horizontal bar, with means to rigidly affix the length of said bar, for use in checking the symmetry of the vehicle body. In addition, the overhead system can also include a rigid tram-rail with a measuring scale attached. A slideably attached, vertically adjustable, locator is used to make measurements along the axis of the tram, substantially parallel to the longitudinal axis of the rail, in any of the upper vehicle body areas serviced by the overhead system.

DRAWINGS

These and other features, aspects and advantages of the present invention will become better understood with reference to the following description, appended claims and accompanying drawings where:

DESCRIPTION

Figure 1:
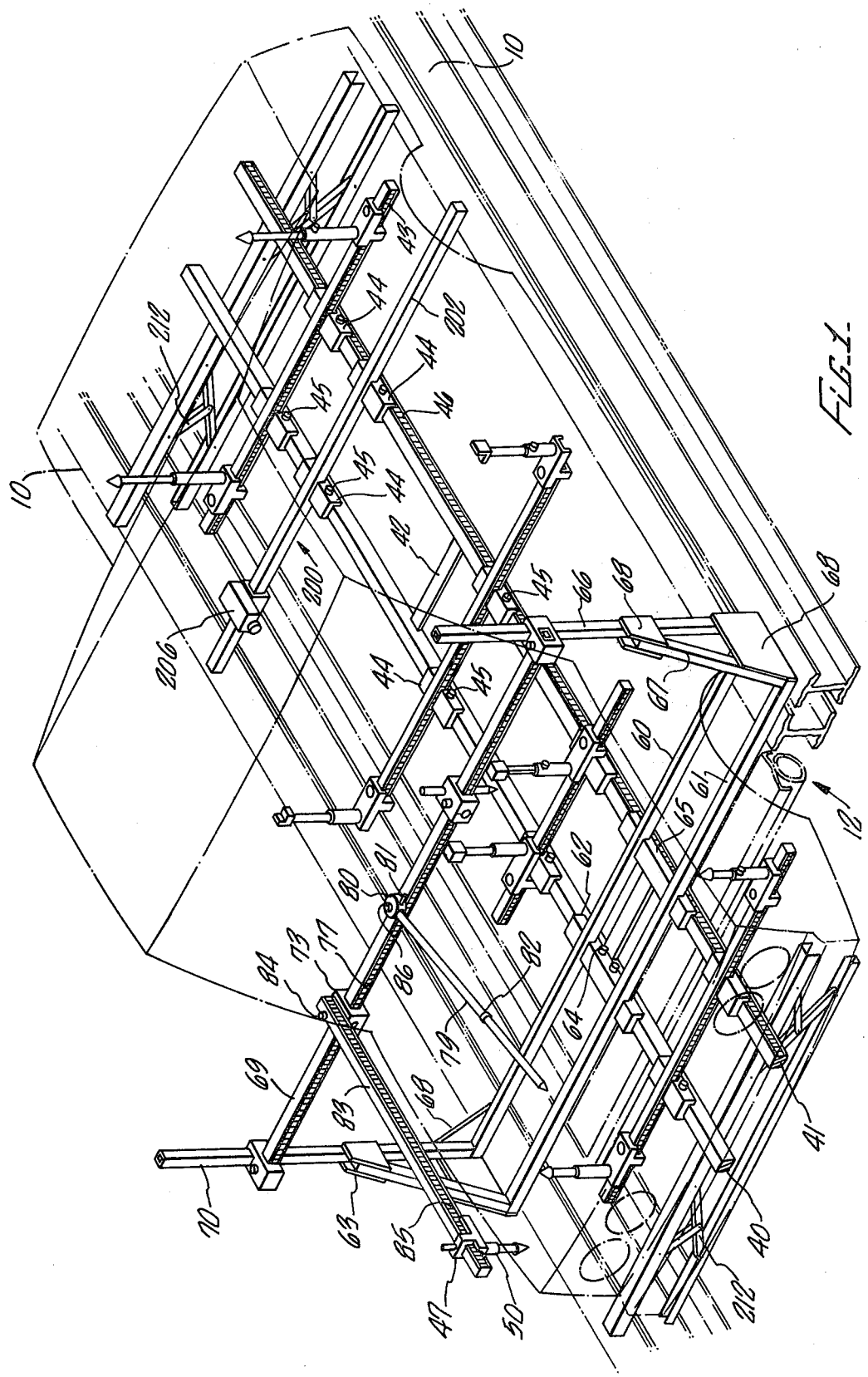
FIG. 1 is a perspective view of a measurement apparatus according to the present invention as it sits on a typical vehicle supporting device.
Figure 3:
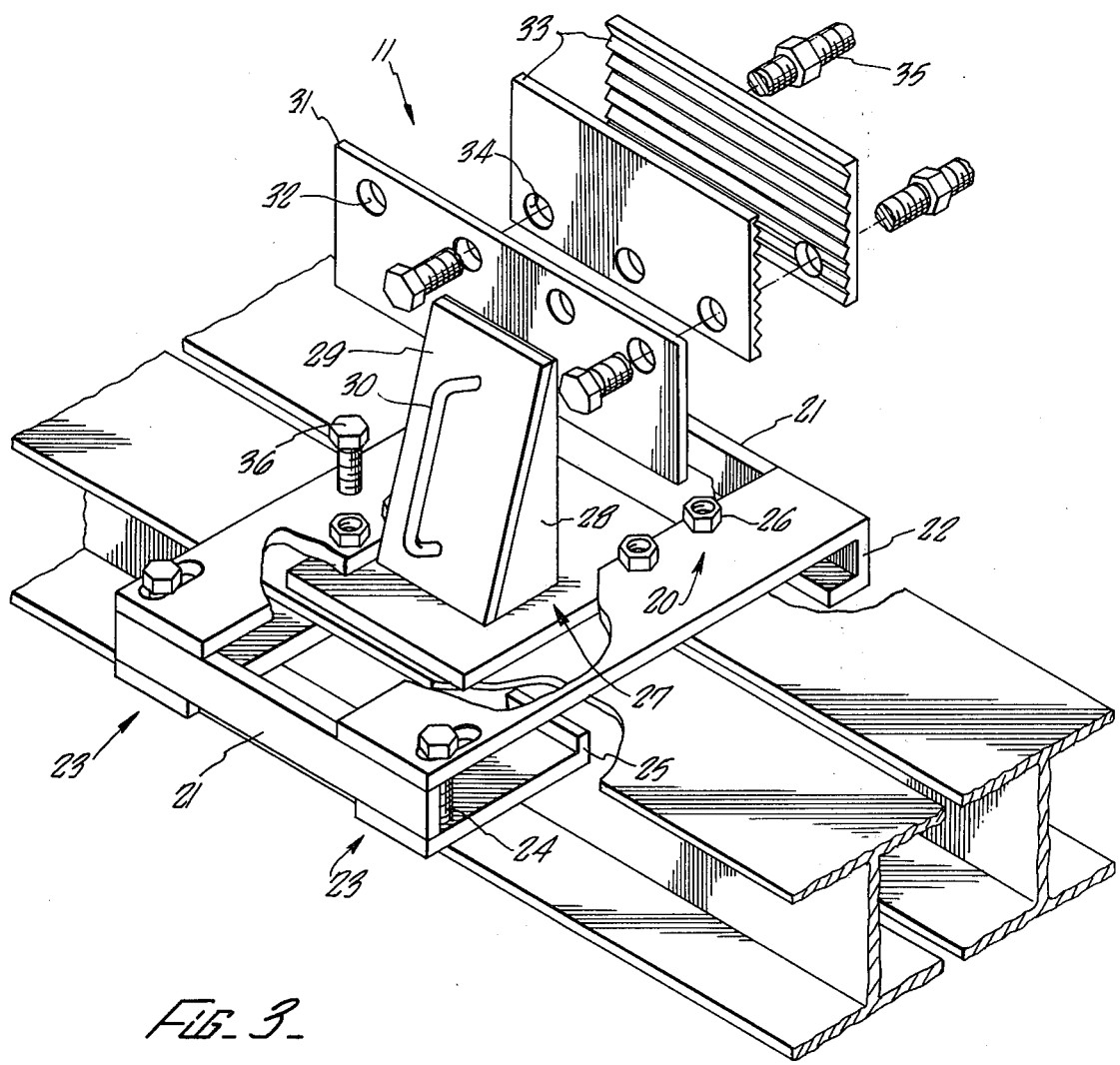
FIG. 3 is a perspective view of a clamping device used to support and rigidly hold a vehicle at the proper height on the vehicle support device such that the measuring system may be used.

As seen in FIG. 1, a vehicle support and straightening device comprising two ramps 10 which support the vehicle via a clamping device 11 such as that shown in FIG. 3. As shown in FIG. 3, the clamping device 11 comprises two anchor bars 20 each longer in length than the width of the ramp 10. They are rigidly held in parallel by end bars 21 on each side of the ramp. These end bars 21 are connected to the anchor bars 20, clamping one of the ramps 10 between and thereby rigidly fixed the clamp 11 along the longitudinal axis of the ramp 10.

At one end of the anchor bar 20, the end to be placed nearest to the center of the vehicle, the anchor bar 20 has a lip 22 that serves to clip under the ramp 10 and runs along the longitudinal axis of the ramps for the width of each of the anchor bars 20. At the other end of the anchor bars 20, the end farthest from the center of the vehicle, two "C" clips 23, are rigidly held apart by the end bar 21. Bolts 24 are used to tighten the "C" clip 23 to the anchor bar 20, clamping the ramp 10 in between the anchor bar 20 and the innermost lip 25 of the "C" clip 23.

On top of the anchor bar 20, there is a series of nuts 26 equally spaced over the portion of the anchor bars 20 that sits above the ramp 10. The clamp assembly also includes a base plate 27 and a vertical support member 28. The vertical support member 28 consists of a inverted piece of "C" channel with a handle 30 attached to a plate 29. The plate 29 is attached to both the top of the vertical support member 28 and the base plate 27 and forms a 60° angle with the base plate 27. The vertical support member 28 is attached to the base plate 27 in the center of the half of the base plate 27 farthest from the vehicle center. Attached to the upper portion of the vertical support member 28 is a clamping plate 31, the length of which is equal to the length of the end bars 21. Holes 32 through the width of the clamping plate 31 are equally spaced in the direction along the longitudinal axis of the ramps 10. The clamping plates 33, also have holes 34 in the lower portion of the plates 33. The vehicle is clamped by placing a lower structural member between the clamping plates 33 and tightening the clamping bolts 35. The clamp base plate 27 is slideable across the width of the ramps and sits between the ramps 10 and the anchor bars 20. To secure the clamp base plate 27 along the width of the ramps, bolts 36 may be tightened thru the nuts 26 fixed to the anchor bars 20 onto the base plate 27 thereby clamping the base plate 27 between the anchor bar 20 and the ramps 10.

As shown in FIG. 1, the measurement system consists of two elongated rails 40, 41 which independently rest on the vehicle support and straightening frame 12. The rails 40, 41 are maintained in parallel by a series of transverse cross members 42. Slideably attached to the rails 40, 41 are a series of reference members 43. Each reference member 43 is rigidly connected to a slider block 44 which is slideable along the rails 40, 41 with means 45 to fixably secure the reference member 43 to the rails 40, 41 such that the reference members 43 are always substantially perpendicular to the longitudinal axis of the rails 40, 41, and in a plane substantially parallel to the plane of the rails 40, 41. Each slider block 44 has a measurement scribe mark at its midpoint for use in locating the slider block 44, and therefore the reference member 43, to the desired position using a slideable scale 46 on either of the rails 40, 41.

Figure 2:
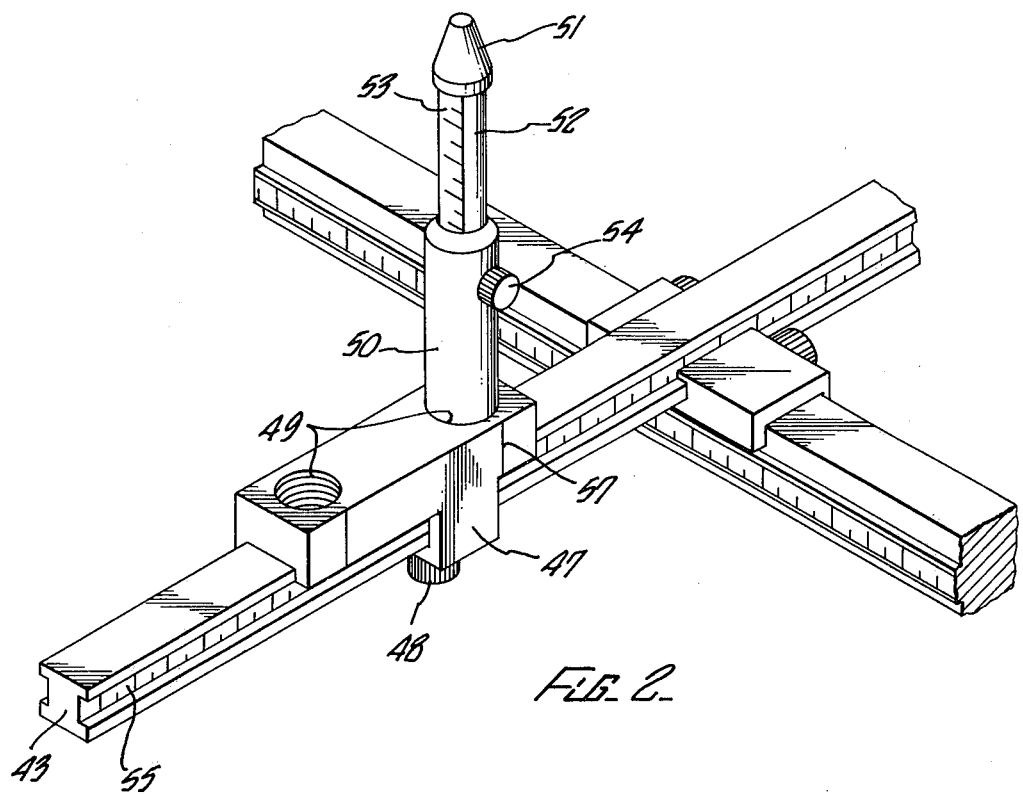
FIG. 2 is a perspective view of a vertical locator slideably attached to a reference member, and one of the reference member's slideable attachments to a rail.

FIG. 2 shows a slideable vertical locating base 47, slideably attached to a reference member 43, with means 48 to fixably secure the vertical locating base 47 to the reference member 43. Each vertical locating base 47 has two threaded holes 49 above the reference member into which a vertical locator 50 is attached. The vertical locator 50 comprises an interchangeable locating head 51 in the shape of a cone, a needle, a socket, or a block; a vertically adjustable inner shaft 52 with an inscribed scale 53 for measurement or location purposes; and, means 54 for fixably securing the vertically adjustable inner shaft 52 at a desired height. The inner shaft 52 telescopes within the vertical locator 50 enabling vertical adjustments to be made by loosening the means 54 to fixably secure the inner shaft, and vertically sliding the inner shaft 52 relative to the vertical locator 50. Each locator base also comprises a scribe mark 57 corresponding to the center of the inner shaft 52 to be used to locate the vertical locator 50 on the inscribed scale 55 on each side of the reference member 43.

As shown in FIG. 1, the measuring system also comprises an overhead measurement system which comprises two correlation members 60, 61. The correlation members 60, 61 are rigidly attached to two elongated sliders 62 with means 64 to fixably secure the elongated sliders along the longitudinal axis of the rails 40, 41. On each slider is a scribe mark 65 for use on the scale 46 on sides of rails 40, 41.

Figure 4:
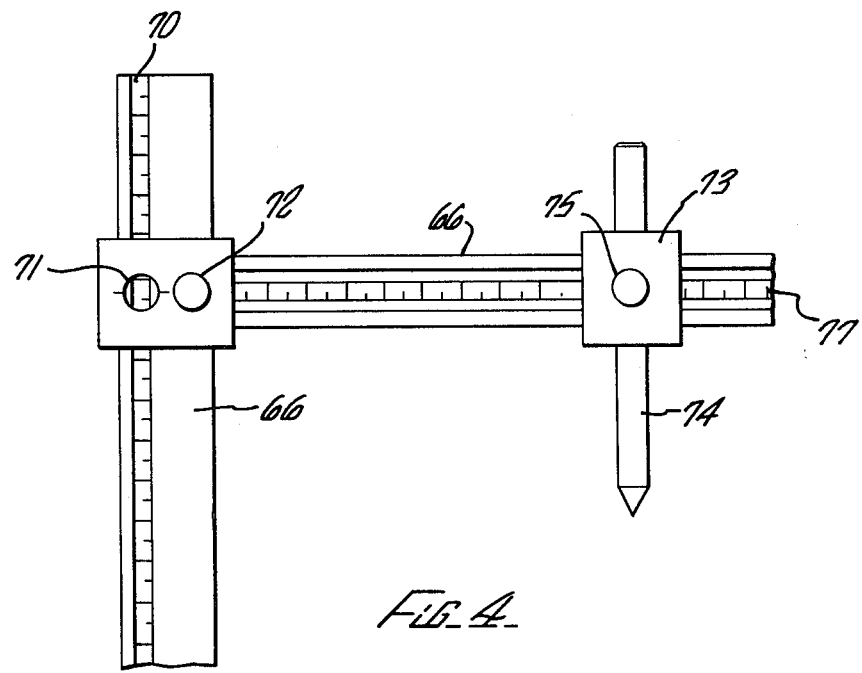
FIG. 4 is a rear elevational view of the overhead horizontal bar measurement system.

At each end of one of the correlation members 60 is a removable upright 66. An inclined support member 67 attaches to the approximate midpoint of each upright 66 and the other correlation member 61. Flat plates 68 are attached to connect each upright 66 to the inclined support member 67 and each to their removable correlation member 60, 61. A horizontal bar 69 is removably attached between the uprights 66. As FIG. 4 shows, each upright 66 has a scale 70 and a view hole and scribe mark 71 corresponding to the center of the horizontal bar 69 and means 72 for rigidly affixing the horizontal bar 69 to a specified location on the upright 66.

At least one collar slider 73 is slideably attached to the horizontal bar 66. As shown in FIGS. 1 and 4, the collar slider 73 consists of a vertically adjustable locating pin 74, means 75 for rigidly affixing the locating pin, a view hole and scribe mark 76 for locating to the inscribed scale 77 on the horizontal bar 66, and means 78 for fixably securing the collar slider 73 to the horizontal bar 66.

As shown in FIG. 1, at the midpoint of the horizontal bar 66 is an attachable pivotal telescopic bar 79 for use in checking vehicle symmetry. The pivoting telescopic bar 79 comprises means 86 to attach the swiveling base 80 to the horizontal bar 66, a pin joint 81 between the telescopic bar 79 and the swiveling base 80, and means 82 to rigidly affix the length of the bar 79. FIG. 1 also shows an attachable rigid tram rail 83 which can be connected to the top of a collar slider 73, along an axis substantially parallel to the longitudinal axis of the rails 40, 41. The tram rail 83 comprises means 84 for rigidly attaching the tram rail 83 to the collar slider 73, inscribed scales 85 on each side of the tram rail 83, a sliding locator base 47 with a vertical locator 50.

The proposed apparatus is totally independent of the frame straightening device. This allows it to move with the vehicle, if the vehicle should move during the straightening process, and thereby eliminates costly time spent in readjustment of the entire system. Since the upper system is attached to the lower system and not the frame straightening device, it too can move if necessary. Moreover, the proposed system can be used to align any portion of the upper vehicle, including the trunk and underhood areas as well as the passenger compartment opening, without changing the positions of the vehicle on the vehicle supporting device. Since the measuring apparatus also includes a set of clamps to support the vehicle at the correct height, the proposed invention is adaptable to most frame and body straightening systems currently in use.

As shown in FIG. 1, the apparatus can also include a laser subassembly 200 that includes a laser support member 202 that is at least as long as the distance between the ramps, and two slider blocks 44 for slideably securing the laser support member to the rails so that the laser support member can slide along the length of the rails and can slide perpendicular to the rails. A laser 206 is pivotally mounted on the end of the laser support member 202. If desired, two lasers can be used, one on each end of the laser support member. The lasers can be used for the purpose of wheel alignment and to check and maintain calibration of the measuring system.

An advantage of the use of the laser with the frame measuring apparatus is that the laser support member is maintained in proper alignment with the vehicle by the remainder of the measuring system, and does not interfere with the straightening equipment during the straightening process.

The measuring system can also include means to raise and lower the entire system such as a scissor jack 212. One scissor jack 212 is placed under each end of the main frame of the measuring system.

The use of the lifting means allows the measuring system to be used at a datum-line that is not parallel to the plane of the vehicle. Some of the commonly used specification books for aligning the frames of vehicles use an imaginary datum-line, that often is not a plane parallel to the plane of the vehicle.

While an exemplary embodiment of the invention has been described, it is to be understood that the invention is not limited to the details herein explained. It is expected that given the teachings herein, those skilled in the art will recognize numerous variations and equivalents which come within the spirit of the invention and which are intended to be included herein.

What is claimed is:

1. A vehicle body-and-frame measurement apparatus for use in realigning the entire structure of a damaged unibody vehicle having reference points when the vehicle is supported on ramps, the ramps having a longitudinal axis and a horizontal plane, the apparatus comprising means for measuring the lower portion of the vehicle body-and-frame comprising:

(a) at least two elongated rails to be supported by the ramps without fixably securing the rails to the ramps, the rails to be supported by the ramps substantially parallel to the longitudinal axis of the ramps;

(b) cross-members between the rails for holding the rails in fixed parallel relationship relative to each other;

(c) a plurality of reference members retained by the rails and means for slideably securing the reference members to the rails so that the reference members can slide along the longitudinal axis of the rails and can slide horizontally perpendicular to the rails;

(d) at least two slideable vertical locators for each of at least two of the reference members slideably retained on the respective reference members, the locators being sufficiently long to reach reference points of the vehicle;

(e) means for fixably securing each vertical locator to its respective reference member;

(f) a pair of vertical uprights supported by the rails and having a vertical axis substantially perpendicular to the horizontal plane of the ramps;

(g) a vertically adjustable horizontal bar slideably attached to the uprights for positioning above the vehicle frame or within the passenger compartment with the windows open, substantially perpendicular to both the longitudinal axis of the ramps and the vertical axis of the uprights;

(h) means for affixing the horizontal bar to the uprights so that the bar is vertically adjustable;

(i) at least to upper vertical locators slideably attached to the horizontal bar;

(j) a rigid tram rail having at least one scale, the tram being attached to the horizontal bar, the bar being substantially parallel to the longitudinal axis of the rails and perpendicular to the horizontal bar;

(k) means for affixing the tram rail to the horizontal bar so that the tram rail can slide along the length of the horizontal bar; and (l) a vertical locating base including a vertical locator slideably attached to the tram rail, the base being movable along the longitudinal axis of the tram rail.

2. The apparatus of claim 1 including means for attaching a damaged vehicle frame-and-body to a ramp of vehicle frame straightening apparatus comprising:

(a) a pair of anchor bars, each bar being longer in length than the width of the ramp, the bars being parallel to each other and adapted for positioning on top of the ramp;

(b) a pair of end-bars slideable beneath the ramp with one end-bar at each end of the anchor bar;

(c) fastening means for holding the end-bars to the anchor bars with the ramp clamped therebetween;

(d) a clamp base insertable between the ramp and the anchor bars, the clamp base being slideable across the width of the ramp when the fastening means are loosened and the clamp base being fixed in position between the ramp and the anchor bar when the fastening means are tightened; and (e) vehicle clamping means supported by the clamp base for attachment to a damaged vehicle frame.

3. The apparatus of claim 1 including a pivotal telescopic bar with means for affixing the telescopic bar to the midpoint of the vertically adjustable horizontal bar for use in checking the symmetry of the upper vehicle body-and-frame alignment.

4. An apparatus for attaching a damaged vehicle frame-and-body to a ramp of a vehicle frame straightening apparatus comprising:

(a) a pair of anchor bars, each bar being longer in length than the width of the ramp, the bars being parallel to each other and adapted for positioning on top of the ramp;

(b) a pair of end-bars slideable beneath the ramp with one end-bar at each end of the anchor bar;

(c) fastening means for holding the end-bars to the anchor bars with the ramp clamped therebetween;

(d) a clamp base insertable between the ramp and the anchor bars, the clamp base being slideable across the width of the ramp when the fastening means are loosened and the clamp base being fixed in position between the ramp and the anchor bar when the fastening means are tightened; and (e) vehicle clamping means supported by the clamp base for attachment to a damaged vehicle frame.

5. A vehicle body-and-frame measurement apparatus for use in realigning a damaged unibody vehicle having reference points when the vehicle is supported on ramps, the ramps having a longitudinal axis and a horizontal plane, the apparatus comprising means for measuring the vehicle body-and-frame comprising:

(a) at least two elongated rails to be supported by the ramps without fixably securing the rails to the ramps, the rails to be supported by the ramps substantially parallel to the longitudinal axis of the ramps;

(b) cross-members between the rails for holding the rails in fixed parallel relationship relative to each other;

(c) a pair of vertical uprights supported by the rails and having a vertical axis substantially perpendicular to the horizontal plane of the ramps;

(d) a horizontal bar slideably attached to the uprights for positioning above the vehicle frame or within the passenger compartment with the windows open, the bar being substantially perpendicular to both the longitudinal axis of the ramps and the vertical axis of the uprights;

(e) means for affixing the horizontal bar to the uprights so that the bar is vertically adjustable; and (f) a pivotal telescopic bar with means for securing the telescopic bar to the midpoint of the vertically adjustable horizontal bar for use in checking the symmetry of the upper vehicle body-and-frame alignment.

6. A vehicle body-and-frame measurement apparatus for use in realigning the entire structure of a damaged unibody vehicle having reference points when the vehicle is supported on ramps, the ramps having a longitudinal axis and a horizontal plane, the apparatus comprising means for measuring the vehicle body-and-frame comprising:

(a) at least two elongated rails to be supported by the ramps without fixably securing the rails to the ramps, the rails to be supported by the ramps substantially parallel to the longitudinal axis of the ramps;

(b) cross-members between the rails for holding the rails in fixed parallel relationship relative to each other;

(c) a pair of vertical uprights supported by the rails and having a vertical axis substantially perpendicular to the horizontal plane of the ramps;

(d) a horizontal bar slideably attached to the uprights for positioning above the vehicle frame or within the passenger compartment with the windows open, substantially perpendicular to both the longitudinal axis of the ramps and the vertical axis of the uprights;

(e) means for affixing the horizontal bar to the uprights so that the bar is vertically adjustable;

(f) a rigid tram rail having at least one scale, the tram rail being attached to the horizontal bar, substantially parallel to the longitudinal axis of the rails and perpendicular to the horizontal bar;

(g) means for affixing the tram rail to the horizontal bar so that the tram rail can slide along the length of the horizontal bar; and (h) a vertical locating base including a vertical locator slideably attached to the tram rail, the base being movable along the longitudinal axis of the tram rail.

* * * * *

UNITED STATES PATENT AND TRADEMARK OFFICE
CERTIFICATE OF CORRECTION

PATENT NO. : 4,442,608
DATED : April 17, 1984
INVENTOR(S) : Allan Clausen

It is certified that error appears in the above-identified patent and that said Letters Patent are hereby corrected as shown below:

Other Publications, line 3 (Applicant's AS), "Automtive" should be --Automotive--; line 13 (applicant's CR), "Technicran" should be --Technician--. In the drawings, Sheet 1, Fig. 1, a reference numeral --73-- should be added to represent element 73 on element 69 above element 40; the reference numeral "63" should be --68--; Sheet 2, Fig. 4, the reference numeral 66 between numerals 72 and 75 should be --69--; a horizontal line should be added across element 74 above element 73 and a reference number --78-- should be added to represent element 78; a scribe mark should be added on element 73 above and below element 75 and a reference number --75A-- should be added to represent the scribe mark; the scale 77 should be continued so that it is visible through element 75. Column 4, line 53, "75" should be --(not shown)-- line 54, after "hole", --75-- should be inserted; "76" should be --75A--. Column 6, line 28, "to" should be --two--; line 31, "the bar" should be --the tram--.

Signed and Sealed this

Sixth Day of November 1984

[SEAL]

Attest:

GERALD J. MOSSINGHOFF

Attesting Officer

Commissioner of Patents and Trademarks